Mar. 6, 1923.
J. H. BLAIR
1,447,612
DRAFTING INSTRUMENT
Filed Mar. 25, 1921
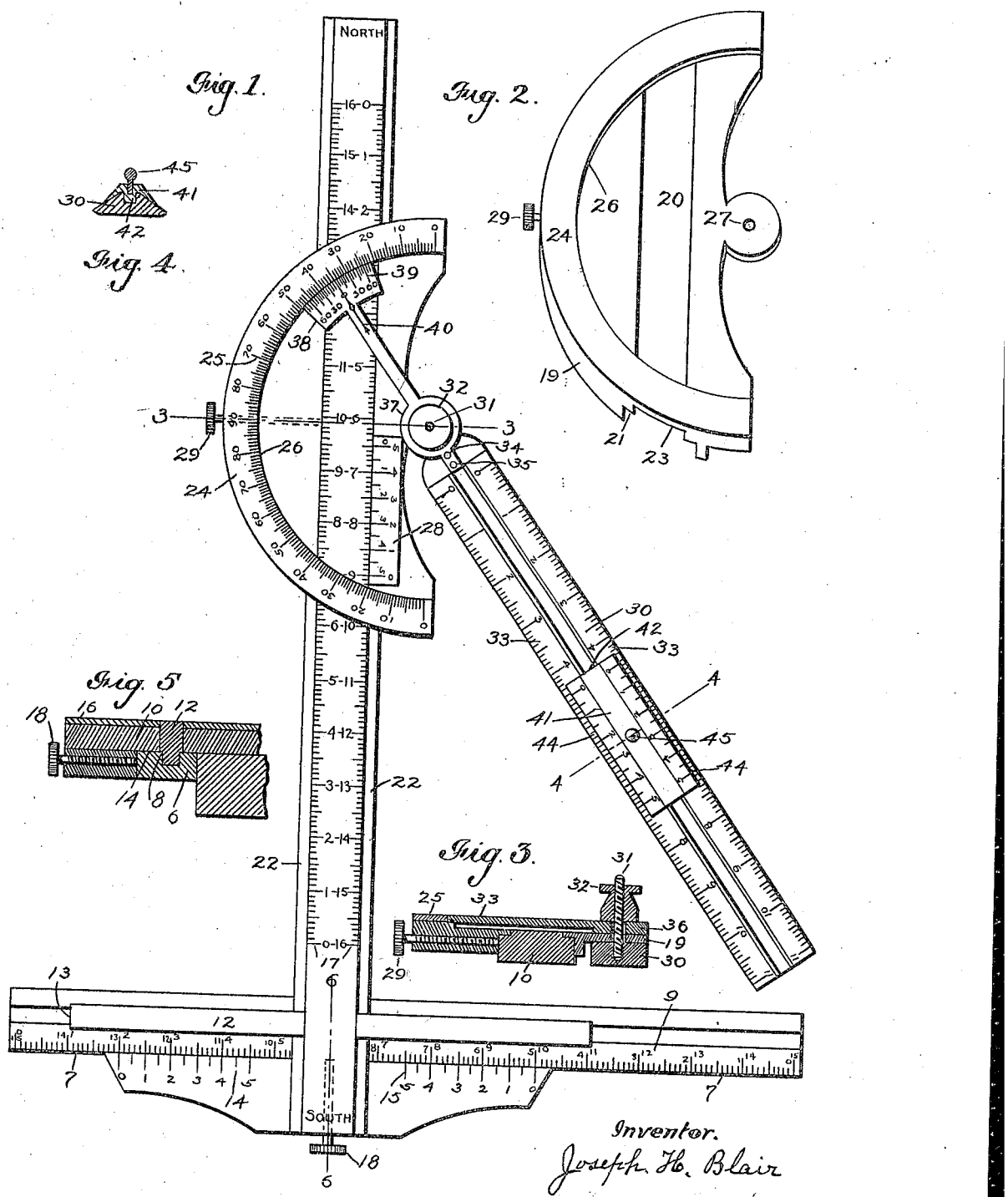
Inventor.
Joseph H. Blair Patented Mar. 6, 1923.

1,447,612

UNITED STATES PATENT OFFICE.

JOSEPH H. BLAIR, OF BOWLING GREEN, MISSOURI.

DRAFTING INSTRUMENT.

Application filed March 25, 1921. Serial No. 455,511.

*To all whom it may concern:*

Be it known that I, JOSEPH H. BLAIR, a citizen of the United States, residing at the city of Bowling Green, in the county of Pike and State of Missouri, have invented a new and useful Drafting Instrument, of which the following is a specification.

My invention relates to drafting instruments, and the objects of my improvements are to provide a single instrument that will perform the functions of nearly all the tools ordinarily used in drawing, and further, to measure the latitude and departure of a line, for the purpose of determining area, without resorting to the use of traverse tables. I attain these objects by the mechanism illustrated in the accompanying drawings, in which—

Figure 1 is a plan view of my complete invention. Fig. 2 is a perspective view of the protractor which I employ to set off angles, with the scale of circular measurement, and the vernier for reading a scale of linear measurement thereon omitted. Fig. 3 is a sectional view of the protractor, the rule, and the rule adjuster taken on the broken line 3—3, Fig. 1. Fig. 4 is a sectional view of the rule and vernier taken on the broken line 4—4, Fig. 1. Fig. 5 is a sectional view of the T square, and straightedge, taken on the broken line 6—6, Fig. 1.

Similar figures refer to similar parts throughout the several views. The instrument consists of—

A straightedge 6 to be attached to the edge of a drawing-board or table by means of screws 7 7, or other suitable means, said straightedge having longitudinally throughout its upper portion a vertical groove 8 parallel to its sides, and a scale 9 of linear measurement secured upon its upper outer surface, graduated into equal divisions and half divisions, the divisions being figured each way from the ends in groups of ten. The half divisions are not shown in Fig. 1, but are shown in Fig. 5. Said divisions may be taken as representing inches, feet, yards, rods, chains, or any other units of linear measurement, as may be elected by the draftsman. The purpose of this scale and its auxiliary vernier, hereinafter described, is to measure the departure of course in surveying, and east and west lines in architectural and other drawings.

A T square 10 and 11 is mounted on the straightedge 6 by means of a transverse horizontal arm 12 connected to the blade 10 of the square by means of screws, or other suitable means, said arm having a downward tongue projection 13 from its bottom adapted to slide in the groove 8 of the straightedge 6, by means of which the blade of the square is maintained at right angles to the straightedge, said blade having a slight cutout underneath portion 14 to keep it from contact with the scale 9 on the straightedge. On each side of the head 11 of the T square is secured a vernier 14 15 contiguous to and registering with scale 9 on the straightedge, which verniers may be graduated as desired, but as shown in the drawing they are graduated into equal divisions from division 0 to division 50, and figured from the 0 divisions to 50 in groups of ten, the smaller divisions are not shown in the scales 14 15 Fig. 1, but are in Fig. 5. Said 50 divisions of said verniers comprise 49 half divisions of the scale 9, and therefore read each of its divisions to its one-hundredth (1/100) part, and if the divisions be taken as representing chains it will read each chain to one link. Along the longitudinal center of the upper surface of the blade 10 of the square is a slight upward projection 16 throughout on which is secured a double scale of linear measurement 17 corresponding with the scale 9 on the straightedge. The purpose of this scale and its auxiliary vernier, hereinafter described, is to measure the latitude of a bearing or course in surveying, and north and south lines in architectural and other drawings, and it is constructed double in order that one or the other scale may be available when the protractor, described further on, is shifted to bring the rule, also described further on, from one side to the other of the blade of the T square (as is ordinarily done when using a protractor) in setting off east and west angles, said protractor being adapted to carry said rule on either side of said blade, but it is not necessary that the rule should be so shifted as all drawings can be made with the rule remaining on either side, as hereinafter explained. I provide a clamp screw 18 in the head of the T square, which enters through the lower portion of the head and contacts slightly with the side of the straightedge, and a slight turn of the screw holds the T square firmly at any desired point.

A partly circular plate or table, (hereinbefore and hereinafter designated as protractor) 19, horizontally and slidably mounted on the blade 10 of the T square by means of a rectangular opening 20 cut upwards from the bottom and entirely through its inner portion and terminating in a groove 21 at the outer ends of the opening adapted to receive the upper portion of the sides of the blade of the T square and to slide on the lower portions 22 22 of said blade. Said grooves having also an inner upper groove 23, cut to a sufficient depth to maintain the protractor from contact with the double scale 17 to prevent injury to the scale by the sliding of the protractor thereon if it were not for this groove. Said protractor having also an upward semi-circular projection 24 along its periphery, on the upper surface of which is secured a scale 25 of circular measurement divided into degrees, the same being figured from its north and south 0° points each way to 90° in groups of ten degrees each. It may be figured from 0° to 180° or 360° if desired. Said protractor also having, at the inner lower portion of said projection, a lip projection 26 on which end of the rule adjuster rides when the rule is rotated, (said rule and adjuster is described further on) also having a circular vertical orifice 27 at the center of the circle, and a vernier 28 secured along the upper outer edge of the opening 20 registering with the scale 17 on the blade of the T square, both lying in the same plane. This vernier is similar to the verniers 14 15 on the head 11 of the T square, except that this one is figured both ways from its ends. Having also a clamp screw 29 in the outer lower portion of its periphery extending inward and contacting slightly with the side of the T square which when slightly turned clamps the protractor to said blade and holds it firmly at any desired point.

A horizontal rule 30 rotatably fixed to the protractor through its circular vertical orifice 27 by means of a stud-bolt 31 firmly fixed in the rule, said bolt having a clamp nut 32 adjusted to its upper end, a slight turn of which clamps the rule to the protractor and holds it firmly at any desired angle. The under edges of the rule have a slight upward and outward slant so that it may easily rotate over the heads of thumb-tacks if they are used in securing the drawing paper to the drawing-board. Along the longitudinal center of the rule is a groove 43, and the sides of the rule slant outward and downward from said groove, and on each slant is secured a scale 33 33 of linear measurement corresponding with the scale 9 on the straight-edge, except that these scales are figured one way only. Said rule having also a rule adjuster 33, consisting of a bar horizontally and firmly fixed on the end of the rule by means of screws 34 35, and having a circular vertical orifice 36 adapted to receive rotatably the stud-bolt 31, said bar having a lower cylindrical projection 37 on that portion thereof through which said bolt enters, and having its free end 38 fan-shaped, and resting slidably on the lip projection 26 of the protractor. On the face of said fan-shaped end of rule adjuster is secured a double vernier, its scale 39 registering with the scale 25 on the protractor, the top surfaces of both lying in the same plane. Said vernier may be constructed to read said scale 25 as desired, but the scale 39 shown in the drawing has a central 0 division 40 which serves as a pointer to any desired angle or bearing, and twelve divisions extending each way from it, each division representing five degrees, and are figured from said central division 40 each way in two groups 30 and 60 of six divisions each, and each of said twelve divisions comprise eleven divisions of the adjacent scale 25, and therefore reads each of said divisions to 5 minutes. Said rule having also a vernier 41 mounted thereon by means of a tongue projection 42 adapted to slide in the groove 43, the sides of the vernier slanting to conform to the slants of the rule, and on each slant is secured a scale 44 44 graduated similarly to the scales 14 and 15 on the head of the T square, which read each division of the rule to its one-hundredth (1/100) part, having also a handle 45 by which the vernier is operated. The graduations of this vernier are not shown in full in Fig. 1, nor is the half division of the rule shown in Fig. 1 but are in Fig. 5.

The foregoing specifications show the best mode I contemplate in carrying out the principles of my invention. The drawing area of the instrument is dependent on the length of the graduations or scales on the blade of the T square and straightedge.

Having fully described my invention and its operation, what I claim is:

1. In a drafting instrument, the combination with a straight-edge provided with a scale along one edge thereof and with a groove parallel to and spaced from said edge, of a T-square having a head adapted to slide along said edge and provided with a vernier scale to cooperate with the scale on said straight-edge, an arm extending from the blade of said T-square and having a projection adapted to slide in said groove, said blade having a tongue extending longitudinally thereof and being provided with scales reading in opposite directions, a protractor head recessed to receive said tongue and to slide thereon, and having a vernier scale to cooperate with one of said scales, and a straight-edge rotatably mounted on said protractor head.

2. In a drafting instrument, the combination with a straight-edge provided with a scale along one edge thereof and with a groove parallel to and spaced from said edge, of a T-square having a head adapted to slide along said edge and provided with a vernier scale to cooperate with the scale on said straight-edge, an arm extending from the blade of said T-square and having a projection adapted to slide in said groove, said blade having a tongue extension longitudinally thereof, and being provided with scales reading in opposite directions, a protractor head recessed to receive said tongue and to slide thereon, and having a vernier scale to cooperate with one of said scales, and a straight-edge rotatably mounted on said protractor head, said protractor head having a scale graduated in opposite directions from 0° to 90° and said straight-edge having means of securing it in a desired position firmly, and said protractor head having means of securing it firmly at any desired place on the blade of said T-square.

3. In a drafting instrument, the combination with a straight-edge provided with a scale along one edge thereof and with a groove parallel to and spaced from said edge, of a T-square having a head adapted to slide along said edge and provided with a vernier scale to cooperate with the scale of said straight-edge with means for firmly securing said T-square at any desired place on said straight-edge, the blade of said T-square having a tongue extending longitudinally thereof and being provided with scales reading in opposite directions, a protractor head recessed to receive said tongue and to slide thereon, having a vernier scale to cooperate with one of said scales, a straight-edge rotatably mounted on said protractor head and having a groove extending longitudinally thereof and being provided with a scale on each edge thereof, a pointer firmly fixed to one end of the straight-edge, and having a vernier scale on the end of the pointer to cooperate with the scale on the protractor head, said straight-edge having a device provided with vernier scale to cooperate with the scales on its edges said device being adapted to slide in the longitudinal groove of said straight-edge.

JOSEPH H. BLAIR.